Figure 5:
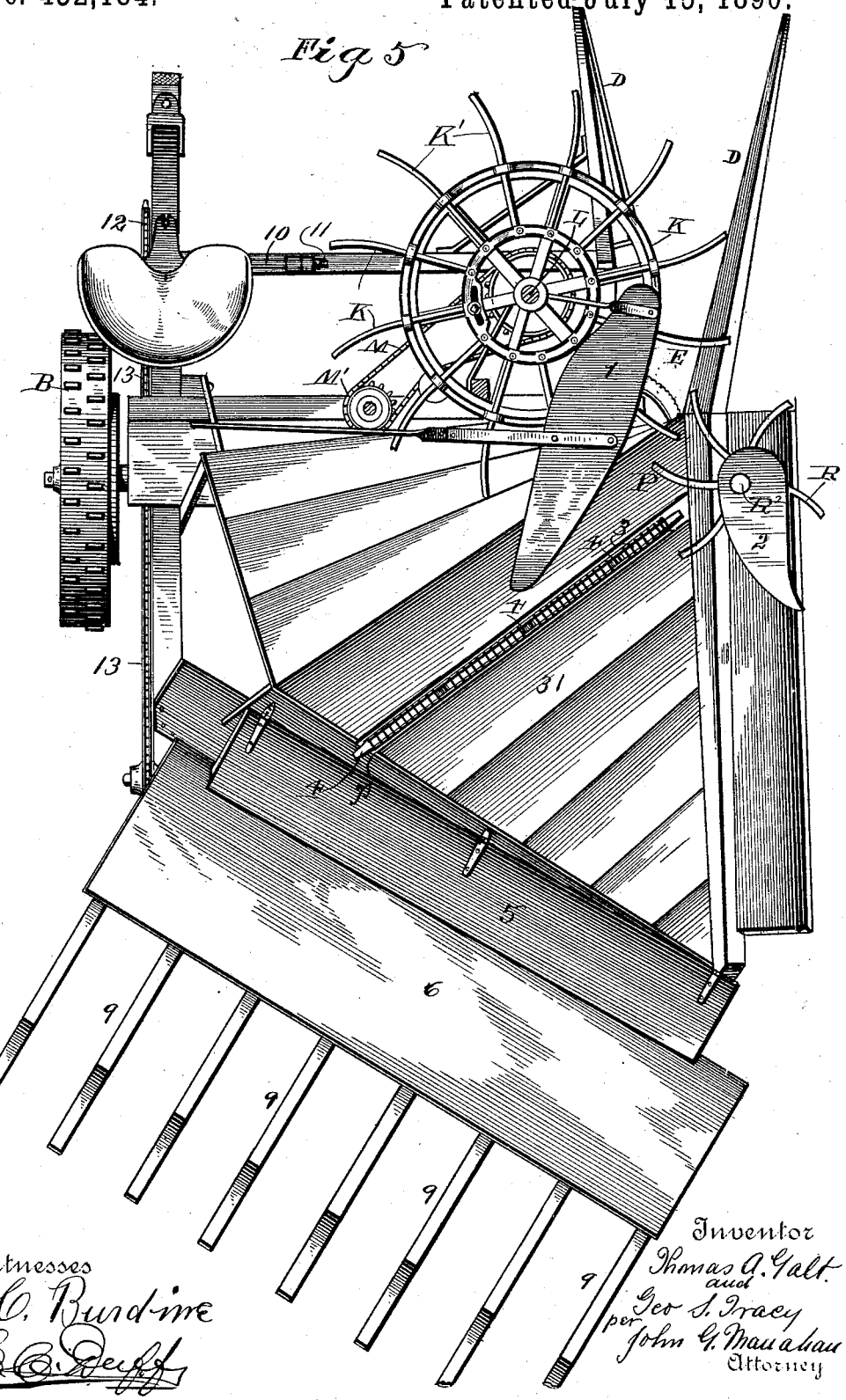

(No Model.) 3 Sheets—Sheet 1.
T. A. GALT & G. S. TRACY.
CORN HARVESTER.
No. 432,184. Patented July 15, 1890.
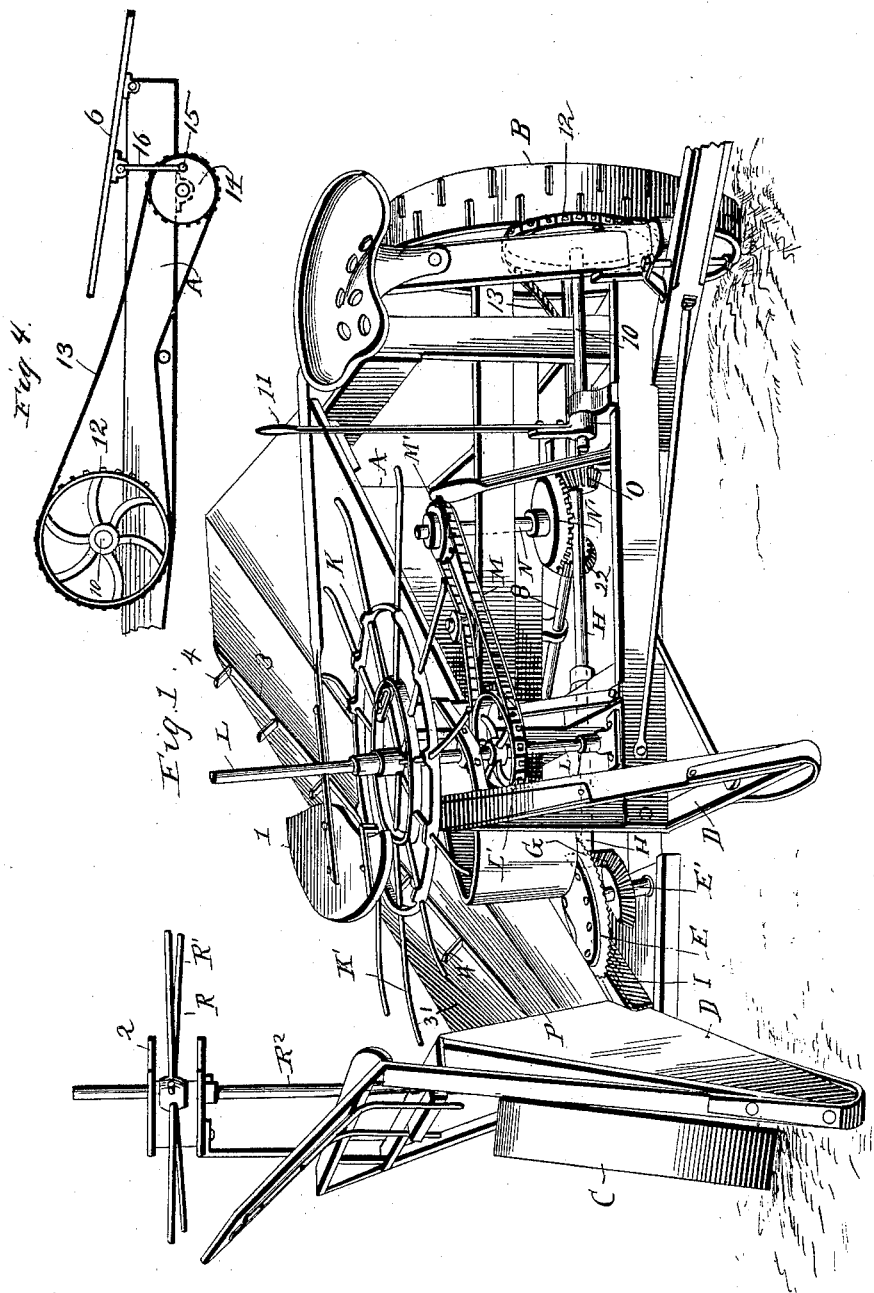
Witnesses.
Inventors
Thomas A. Galt and
George S. Tracy
By
John G. Manahan
their Attorney

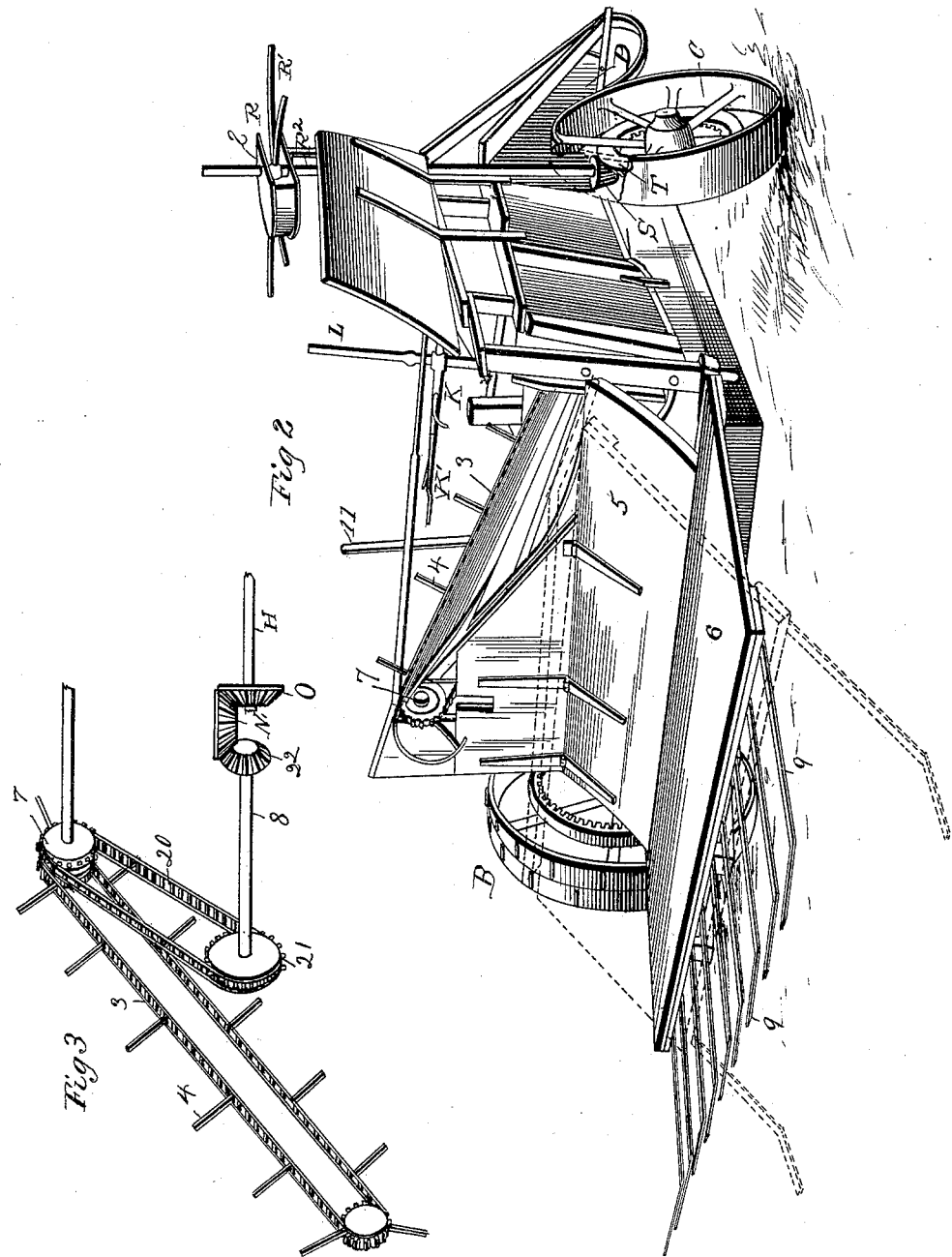

(No Model.) 3 Sheets—Sheet 3.
T. A. GALT & G. S. TRACY.
CORN HARVESTER.

No. 432,184. Patented July 15, 1890.

Witnesses
C. C. Burdine
E. C. Swift

Inventor
Thomas A. Galt
and
Geo. S. Tracy
per John G. Manahan
Attorney

UNITED STATES PATENT OFFICE.

THOMAS A. GALT AND GEORGE S. TRACY, OF STERLING, ILLINOIS.

CORN-HARVESTER.

SPECIFICATION forming part of Letters Patent No. 432,184, dated July 15, 1890.

Application filed November 29, 1889. Serial No. 331,863. (No model.)

*To all whom it may concern:*

Be it known that we, THOMAS A. GALT and GEORGE S. TRACY, citizens of the United States, residing at Sterling, in the county of Whiteside and State of Illinois, have invented certain new and useful Improvements in Corn-Harvesters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention has reference to certain improvements in corn-harvesters; and it consists in devices for turning the severed stalks nearly transversely of the machine and gathering them on the machine in bunches of any desired size preparatory to their deposit upon the ground; also, in devices for effecting such deposit and for preventing the dribbling of stalks from one bunch to another during the operation of dropping the latter.

In the drawings, Figure 1 is an oblique front elevation of a machine embodying our invention. Fig. 2 is a perspective of the rear of the machine. The depressed position of the platform 6 and the elevated position of the intermediate guide and catch-board 5 are shown in dotted lines. Fig. 3 is a detail of the mechanism for driving the stalk-turning chain. Fig. 4 is a detail of a portion of the mechanism for tilting the platform 6. Fig. 5 is a plan of a machine embodying our invention.

A is the frame of the machine, which is supported and carried upon the outer driving-wheel B and the inner wheel C.

D D are the stalk guides and gatherers, which are drawn, respectively, on each side of the row of corn, and have a front sled-runner formation to prevent them from casually engaging the ground, and are made sufficiently pointed to gather and straighten loose or fallen stalks.

In the forward movement of the machine the stalks pass backward between the guides D D, and are severed by a circular knife E, provided with the serrated cutting-edge, and rotated in a substantially horizontal plane, with its front surface passing toward the wheel C on the inner side of the machine. The knife E is seated on a vertical shaft E', having a bevel-gear, which is engaged and actuated by a bevel-pinion G, seated upon the inner end of the shaft H, upon which the driving-wheel B is keyed and by which it is rotated. A beam I, seated opposite to the knife E, forms a backing for the stalks in the operation of their severance by said knife.

A horizontal reel K, provided peripherally with radial arms K', is seated on a vertical shaft L, with its arms K' projected over the interval between the stalk-guides D, occupied by the knife E, and assists the operation of cutting by forcing the upper ends of the stalks backward during said operation. The reel K is keyed upon the shaft L and the latter rotated by means of a sprocket-chain M, carried on the sprocket-wheel L' on the shaft L, and the sprocket-wheel M', keyed on the short vertical shaft N, to the lower end of which is keyed a bevel-gear N', having its spurs projected downward and engaged and actuated by a bevel gear-wheel O, keyed upon the shaft H. The reel K is required to be seated about as far front as the knife E, that its arms K' may feed the stalks to the latter, and it results from this construction that the stalks after being severed are left to their own gravity in falling, and therefore do not fall at once after being severed or fall in a a disordered manner. To obviate this difficulty, we provide an angular trough P, which is a substantial prolongation rearward of the interval between the guides D D. On the side of the trough P is seated a secondary or supplemental reel R, having radial arms R' in a horizontal plane to engage the stalks after they are severed and cast them immediately and forcibly backward into the trough P, with their tops projecting out of the rear end of the latter.

The reel R is seated rigidly upon the vertical shaft $R^2$, to the lower end of which is keyed the bevel-gear S, which is engaged and driven by a bevel-gear T on the inner face of the wheel C, or the shaft $R^2$ and reel R may be driven in any other suitable manner.

A clearance-board 1 is suitably seated over the reel K, and a similar board 2 over reel R, for the purpose of clearing the radial arms of said reels from passing stalks.

An endless sprocket-chain 3, provided with upwardly-extending projections 4, is seated diagonally of the machine and intersects the trough P at or near its front end and rises toward the rear of the machine to insure the discharge of the stalks therefrom by dropping the butts of the stalks from the altitude thus attained to the apron 5, the jar of which fall also serves to shake the other ends of the stalks loose from the trough P. A triangular-shaped platform 31 extends from trough P, forming the bottom and outer side of the latter, and its outer edge being raised to a uniform height with said chain throughout the carrying portion of the latter. This prevents the sagging or catching of the stalks intermediate said stalk and chain or of the ears of corn thereon, and assists said chain in keeping and delivering said stalks in an orderly condition parallel with each other.

As before stated, the stalks are cast by the reel R into the trough P and fall therein with their tops extending through the rear end of said trough and with their butts projected forward at or near the knife E. In this position the butts of said stalks fall across the lower end of the chain 3, and the upper side of said chain, moving toward the rear of the machine, seizes said stalks at or near their butts within the projections 4 on said chains and carries said butts in a circle of which that part of the stalks which rests on the rear edge of trough P forms the center and casts said stalks nearly transversely of the machine with the butts slightly in advance upon the hinged board 5, from whence said stalks slide of their own gravity to and upon the horizontal platform 6. The lower end of the chain 3 is carried upon a suitable sprocket-wheel 30, seated in any suitable manner on the frame A at the lower end of said chain, and the upper end of said chain is carried upon a similar sprocket-wheel 7, seated at that point on said frame. The sprocket-wheel 7 has a double face and is driven by a sprocket-chain 20, carried on its second face and extending therefrom downward to a corresponding sprocket-wheel 21, seated on the inner end of the shaft 8. The latter shaft is suitably seated in the frame A and projects diagonally under the frame A from the spur-gear N', and is provided with a bevel-pinion 22 at the end adjacent to the gear N', which is engaged and driven by the latter, or said chain 3 may be driven in any other suitable manner.

The guide and catch-board 5 is hinged to the frame A across the rear of the latter, and performs the threefold function of affording a chute onto the platform 6 when the latter is horizontal, and when the latter is rearwardly depressed, as shown in dotted lines in Fig. 2, said catch-board 5 both covers the interval between the rear of the platform 6 and the machine, and prevents oncoming stalks from dropping into such interval and arrests and holds the oncoming stalks on its own upper surface until the platform 6 shall have been returned to the horizontal position, when the board 5 resumes its function of a chute. The board 5 is raised and lowered wholly by the coincident movement of the front edge of the platform 6. To the rear edge of the platform 6 are attached a rearwardly-extending series of rods 9, which, when said platform is depressed, receive the bunches of stalks thereon, and said rods, in the depressed position of said platform, being on and near the ground, the stubs of the cornstalks and other projections on the ground project upwardly between the rods 9 and engage the stalks thereon, which, with the forward motion of the machine, causes said stalks to be immediately and certainly drawn off from said rods, and the platform 6 is then returned to its horizontal position.

While the platform 6 can be held and tilted in many obvious modes in our construction, it is done as follows: The rock-shaft 10 is seated transversely on the frame A under the driver's seat and a lever 11 rigidly seated thereon and projected upward within convenient reach of the driver. On the outer end of the shaft 10 is keyed the sprocket-wheel 12, from which the sprocket-chain 13 communicates to a similar sprocket-wheel 14, seated on the frame A in the rear of the driving-wheel B. The wheel 14 is provided on its outer face with a wrist-pin 15, and, the platform 6 being hinged centrally to the frame A in any suitable manner, there is projected upward from the wrist-pin 15 a short pitman 16, which is pivotally connected at its upper end with the lower surface of the platform 6 in front of the pivotal seat of the latter. By the rotation of the shaft 10 and sprocket-wheel 12 through the medium of the lever 11 and by means of the chain 13 the wrist-pin 15 is caused to traverse the arc of a circle either upward or downward, carrying with it the pitman 16, which positively raises and lowers the front edge of the platform 6, as may be desired. We do not limit ourselves to this mode of tilting the platform 6, as various other modes equally efficient can be employed.

The advantages of the employment of the supplemental reel R in the position shown is that it certainly and immediately casts the stalks into the trough P and across the chain 3, from whence the butts of said stalks are carried about one-fourth of a circle by said chain and precipitated upon the platform 6 and ultimately upon the rods 9 transversely of the machine. As the platform 6 is under the absolute control of the driver, the stalks may be allowed to accumulate thereon in sufficient number for one-half of a shock and then be deposited, as aforesaid, in a neat and compact gavel upon the ground, and upon the return trip of the machine the gavels respectively constituting the rest of the shock can be deposited opposite those already dropped and the shock be readily and conveniently set up therefrom between said gavels.

The outer ends of the platform 31, apron 5, and platform 6 are slightly in advance of a line in their plane perpendicular to the line of movement of the machine, whereby the gavels are deposited obliquely of said line of movement, the butts of the gavels being slightly in advance to afford more room for the next passage of the team.

The chain-carrier 3 is superior to the usual aprons in this, that the latter discharge the stalks in a disordered mass, while said chain seizes and straightens the individual stalks and discharges them parallel with each other in convenient shape for subsequent handling. Aside from the foregoing, the function of said chain is peculiar. It is intended to merely carry one end of the stalks around the portion of a circle, while the other end of said stalks rests in the outlet of the trough P until said stalks are in position to be discharged nearly transversely of the machine and then cast them on the apron 6.

What I claim as my invention, and desire to secure by Letters Patent of the United States, is—

1. In a corn-harvester, the combination of a receiving-trough P, placed lengthwise of the machine and adapted to receive the severed stalks with their butts to the front, and an endless chain 3, extended under the forward end of said trough, with its upper side running diagonally outward, upward, and rearward therefrom, and adapted to seize the butt-ends of the severed stalks and carry them outward, upward, and rearward, and, in co-action with the rear end of said trough, to discharge said stalks transversely of the machine, substantially as shown, and for the purpose described.

2. In a corn-harvester, the combination of a receiving-trough located substantially lengthwise of the machine and communicating at its forward end with the cutting mechanism thereof, a stalk-adjusting reel R, seated alongside of said trough and adapted to cast the severed stalks lengthwise into said trough with their butts toward said cutting mechanism, and an endless carrying-chain 3, projected at its forward end across the bottom of said trough near the front end of the latter and extended outward, upward, and rearward therefrom, and adapted to carry the butts of the stalks outward, upward, and rearward about one-fourth of a circle while the upper ends of said stalks are being held in the rear end of said trough, and, in conjunction with the rear end of said trough, to discharge said stalks transversely of the machine, substantially as shown, and for the purpose described.

3. In a corn-harvester, the combination of a tilting platform 6, hinged transversely of said machine, a pitman 16, pivotally connected at its upper end to the lower surface of said platform in front of the hinged seat of the latter, a wheel 14, provided with crank-pin 15, pivotally connected to the lower end of said pitman, means, substantially as shown, for intermittently rotating wheel 14, apron 5, hinged at its front edge to the rear of said machine directly under the stalk-discharge thereof, with its rear edge extending slightly over the front edge of the platform 6 and resting thereon, whereby the upward tilting of the front edge of the platform 6 tilts upward the rear edge of the apron 5, substantially as shown, and for the purpose described.

4. In a corn-harvester, the combination of a stalk-receiving trough P, located substantially lengthwise of the machine, a stalk-carrying chain 3, having its forward end projected under the front portion of said trough and running diagonally outward, upward, and rearward therefrom, an ultimately receiving and discharging platform 6, and an intermediate apron 5, adapted to alternately guide the stalks from said chain and trough to and upon said platform 6 and to temporarily arrest the flow of stalks to the latter, substantially as shown, and for the purpose described.

5. The combination, in a corn-harvester, of suitable cutting mechanism, a trough P, located substantially lengthwise of said machine, with its front end communicating with said cutting mechanism and its rear end open, a stalk-carrying chain 3, having its forward end projected under the front portion of said trough and running diagonally outward, upward, and rearward therefrom, and an inclined platform 31, extending from said trough to said chain, substantially as shown, and for the purpose specified.

6. In a corn-harvester, the combination of a substantially horizontal stalk-receiving trough P, a stalk-carrying chain 3, extending at its front end under the front portion of said trough and running outward, upward, and rearward therefrom, and a platform 31, forming the bottom and outer side of said trough and having its outer edge raised to the plane of the carrying portion of said chain and adjacent thereto, substantially as shown, and for the purpose described.

7. In a corn-harvester, the combination of a substantially horizontal stalk-receiving trough P, a stalk-carrying chain 3, extending at its front end under the front portion of said trough and running outward, upward, and rearward therefrom, a platform 31, forming the bottom and outer side of said trough and elevated at its outer edge to the plane of said carrying-chain, and a tilting platform hinged obliquely to said machine and adapted to deposit the gavels obliquely to the line of movement of said machine, substantially as shown, and for the purpose described.

In testimony whereof we affix our signatures in presence of two witnesses.

THOMAS A. GALT.
GEO. S. TRACY.

Witnesses:
JOHN G. MANAHAN,
HENRY C. WARD.